US011390790B2

(12) United States Patent
McDaniel et al.

(10) Patent No.: US 11,390,790 B2
(45) Date of Patent: Jul. 19, 2022

(54) COLLOIDAL DISPERSIONS (SOLS) FOR WEIGHTING AGENTS IN FLUIDS

(71) Applicant: HALLIBURTON ENERGY SERVICES, INC., Houston, TX (US)

(72) Inventors: Cato Russell McDaniel, Montgomery, TX (US); Dale E. Jamison, Humble, TX (US); Rui Shen, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 138 days.

(21) Appl. No.: 15/524,573

(22) PCT Filed: Dec. 19, 2014

(86) PCT No.: PCT/US2014/071423
§ 371 (c)(1),
(2) Date: May 4, 2017

(87) PCT Pub. No.: WO2016/099542
PCT Pub. Date: Jun. 23, 2016

(65) Prior Publication Data
US 2018/0273823 A1 Sep. 27, 2018

(51) Int. Cl.
*C09K 8/03* (2006.01)
*C09K 8/40* (2006.01)
(Continued)

(52) U.S. Cl.
CPC ............... *C09K 8/032* (2013.01); *C09K 8/03* (2013.01); *C09K 8/40* (2013.01); *C09K 8/54* (2013.01);
(Continued)

(58) Field of Classification Search
None
See application file for complete search history.

(56) References Cited

U.S. PATENT DOCUMENTS

| 4,080,421 A | 3/1978 | Kasserra |
| 4,557,718 A | 12/1985 | Kamps et al. |

(Continued)

FOREIGN PATENT DOCUMENTS

| CA | 2617155 A1 | 7/2008 |
| CA | 2818630 A1 | 6/2012 |
| WO | 2013122775 A1 | 8/2013 |

OTHER PUBLICATIONS

Ahmadi, Tehrani et al.; AADE-07-NTCE-02; "Can you Improve Rheology and Mitigate Barite Sag in Invert Emulsion Fluids through Brine Phase Treatment"; 2007.

(Continued)

Primary Examiner — Anuradha Ahuja
(74) Attorney, Agent, or Firm — Polsinelli PC

(57) ABSTRACT

A sag-resistant fluid, such as a drilling fluid, a completion fluid, or a spacer fluid, including a colloidal suspension that includes a continuous liquid phase and a solid phase suspended in the continuous liquid phase. The solid phase includes a plurality of particles, having an average diameter of the plurality of particles less than about 1000 nm. The sag-resistant fluid has a density of from about 7 to about 30 lbm/gal, and exhibits a density variation of less than about 0.5 lbm/gal over a time period of at least about 16 hours. A method including circulating the sag-resistant fluid through a well.

25 Claims, 1 Drawing Sheet

(51) Int. Cl.
*C09K 8/54* (2006.01)
*C09K 8/82* (2006.01)
*C09K 8/92* (2006.01)

(52) U.S. Cl.
CPC ............... *C09K 8/82* (2013.01); *C09K 8/92* (2013.01); *C09K 2208/32* (2013.01)

(56) References Cited

U.S. PATENT DOCUMENTS

| | | | |
|---|---|---|---|
| 7,273,832 B2 | 9/2007 | Benton et al. | |
| 8,476,201 B2 | 7/2013 | Miller et al. | |
| 2005/0239662 A1 | 10/2005 | Patel | |
| 2008/0135302 A1 | 6/2008 | Zhang et al. | |
| 2009/0082230 A1* | 3/2009 | Javora | C09K 8/04 507/269 |
| 2009/0205871 A1 | 8/2009 | Tibbitts | |
| 2010/0137168 A1* | 6/2010 | Quintero | C11D 3/18 507/124 |
| 2010/0188253 A1* | 7/2010 | Shearer | E21B 47/18 340/853.3 |
| 2010/0300759 A1 | 12/2010 | Passade-Boupat et al. | |
| 2012/0032543 A1* | 2/2012 | Chakraborty | B82Y 30/00 310/90 |
| 2012/0073813 A1* | 3/2012 | Zamora | C04B 28/02 166/285 |
| 2012/0165231 A1* | 6/2012 | Miller | C09K 8/03 507/143 |
| 2013/0341022 A1* | 12/2013 | Nguyen | C09K 8/032 166/279 |
| 2014/0209386 A1* | 7/2014 | Jamison | C09K 8/032 175/65 |
| 2014/0336087 A1 | 11/2014 | Wetherell | |
| 2015/0065398 A1* | 3/2015 | Gartland | C09K 8/36 507/118 |
| 2016/0009979 A1* | 1/2016 | Husein | C09K 8/36 507/140 |

OTHER PUBLICATIONS

Sandeep, Kulkarni et al.; AADE-13-FTCE-26; "Visco-Elastic Settling Rate Models to Determine Sag Potential of Non-Aqueous Drilling Fluids"; 2013.
Olusegun, Falana et al.; AADE-07-NTCE-03-"Novel Sag Reducing Additive for Non-aqueous Drilling Fluids"; 2007.
R.K. Bansal et al.; "A Downhole tool for Reducing ECD"; 2007.
Sharath, Savari et al.; "A Comprehensive Approach to Barite Sag Analysis on Field Muds"; 2013.
J. Chil. Chem. Soc., "Synthesis of Iron and Iron-Manganese Colloids and Nanoparticles Using Organic Solvents", 50, N 2 (2005), pp. 455-460.
MSDS Nutrient Technologies for Tech-Flo Mn-15, 2 Pgs. Aug. 22, 1995.
International Search Report and Written Opinion; PCT Application No. PCT/US2014/071423; dated Aug. 26, 2015.
Office Action; Canadian Application No. 2,966,983; dated Apr. 27, 2018.
Office Action; Canadian Application No. 2,966,983; dated Dec. 20, 2018.

* cited by examiner

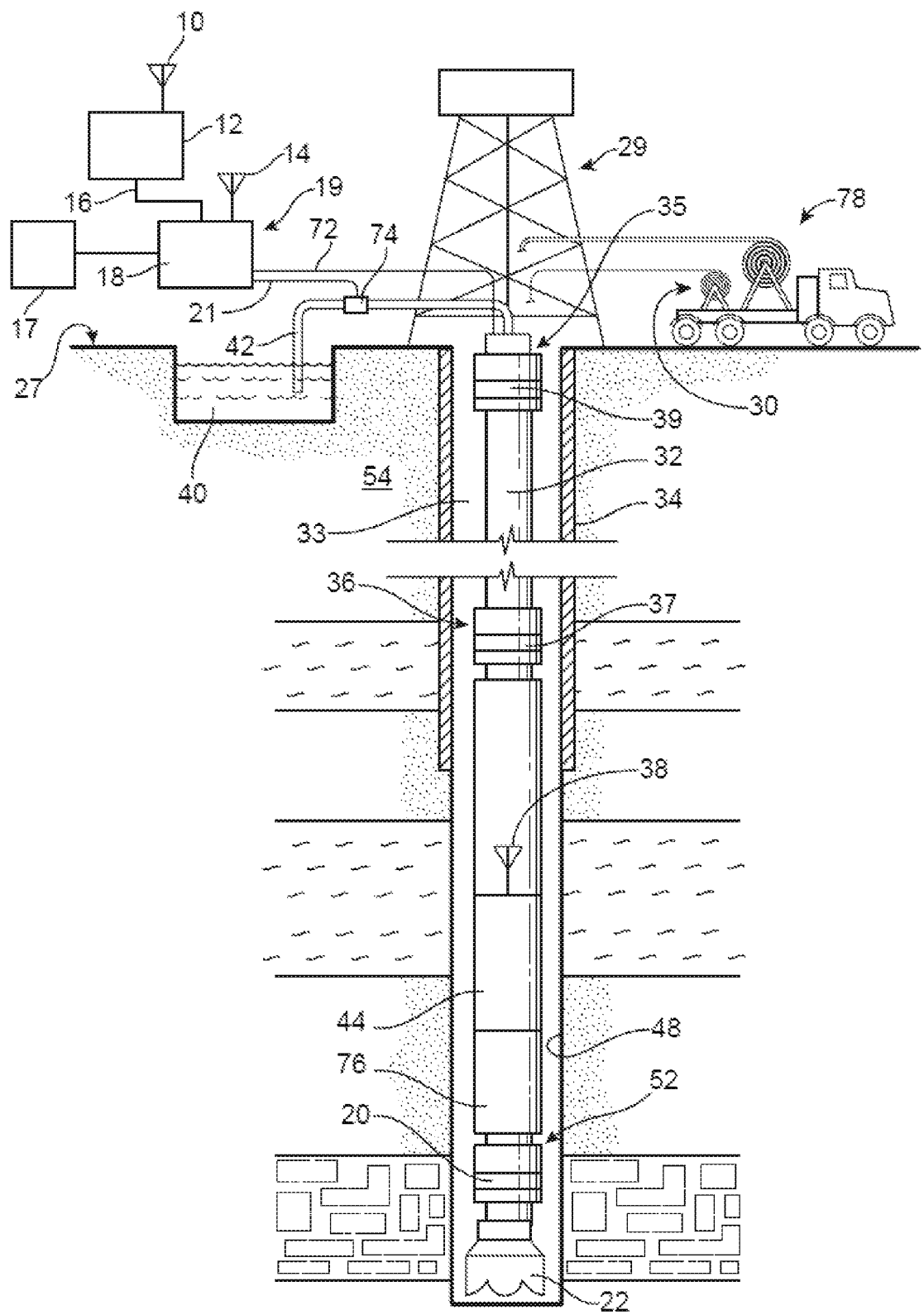

COLLOIDAL DISPERSIONS (SOLS) FOR WEIGHTING AGENTS IN FLUIDS

CROSS-REFERENCE TO RELATED APPLICATIONS

This application is a national stage entry of PCT/US2014/071423 filed Dec. 19, 2014, said application is expressly incorporated herein in its entirety.

FIELD

The disclosure relates generally to fluids and more specifically to sag-resistant fluids.

BACKGROUND

In drilling operations, such as the drilling that occurs in oil field operations, wellbore fluids, such as, drilling fluids, completion fluids, and spacer fluids are designed/formulated to serve several functions. Drilling fluids, in particular, may act as a lubricant to the drill bit to reduce wear and friction during drilling and also to seal the formation surface by forming a filter cake. Currently, in the industry, both oil-based muds (OBMs) and water based muds (WBMs) are typically used. More commonly, synthetic based muds (SBMs) are also used in drilling operations. In the drilling fluid, agents for lubrication will be present as well as weighting materials in order to achieve a density that is typically greater than the surrounding pressure in the well bore. Furthermore, the drilling fluid will also contain a sealing or fluid loss agent, such as calcium carbonate and polymers, in order to form the filter cake on the formation surface of the well bore. In addition, when the drilling fluids are used during drilling, the drilling fluid will also contain drilling fines, such as shale and sandstone fines. During the drilling operations and afterwards, the filter cake seals the formation surface of the well bore so that the well bore can be completely formed without any leakage from the formation surface into the well bore and/or without any leakage of the drilling fluids into the formation surface.

In many drilling operations, the drilling fluid can contain up to 50% by weight of a weighting material such as barite. Barite, also known as barium sulfate, and other alkaline earth metal sulfates are not easily dissolved and are not easily suspended in liquids. Thus, the removal of barite or other alkaline earth metal sulfates that may be present in drilling fluids can be a significant problem.

A completion fluid may be used to "complete" an oil or gas well. A completion fluid may be placed in the well to facilitate final operations prior to initiation of production, such as setting screens production liners, packers, downhole valves or shooting perforations into the producing zone. The completion fluid may control a well should downhole hardware fail, without damaging the producing formation or completion components. The completion fluid may be chemically compatible with the reservoir formation and fluids, and may be filtered to a high degree to avoid introducing solids to the near-wellbore area. Although completion fluids may be compositionally similar to a drilling fluid, a drilling fluid may not be suitable for completion operations due to its solids content, pH and ionic composition. Completion fluids are typically brines, such as chlorides, bromides, and formates, but may be any fluid of proper density and flow characteristics. For example a completion fluid may be a calcium chloride, a zinc chloride, a calcium bromide, a sodium chloride, a potassium chloride, or a cesium formate.

A spacer fluid is any liquid used to physically separate one liquid from another. Some special-purpose liquids may be prone to contamination, so a spacer fluid compatible with each may be used between the two. The most common spacer fluid is water. However, spacer fluids may have a water-base or an oil base. Additionally, various chemicals may be added to enhance the spacer fluid's performance for the particular operation. Spacer fluids may be used when changing mud types and to separate mud from cement during cementing operations.

A variety of wellbore fluids, including but not limited to drilling fluids, completion fluids, and spacer fluids may exhibit "sag." Sag is generally the settling and/or stratifying of heavy inert materials, such as barite, as the fluid is being pumped through the wellbore. Consequently, the specific gravity or weight of the fluid along the fluid column varies. Sag leads to insufficient drilling fluids for well control, wellbore instability and stuck pipe, fracturing of formation while re-suspending a weight material bed as well as insufficient displacement efficiency during cementing operations. When sag occurs, operation costs can escalate.

Therefore, a need exists for sag-resistant wellbore fluids.

BRIEF DESCRIPTION OF THE DRAWINGS

Implementations of the present technology will now be described, by way of example only, with reference to the attached figures, wherein:

FIG. 1 is a partial cross-section view illustrating an embodiment of a drilling rig for drilling a wellbore with the drilling system configured in accordance with the principles of the present disclosure.

DETAILED DESCRIPTION

The present disclosure may be understood more readily by reference to the following detailed description of preferred embodiments. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

In geotechnical engineering, "drilling fluid" is used to aid the drilling of boreholes into the earth. Often used while drilling oil and natural gas wells and on exploration drilling rigs, drilling fluids are also used for much simpler boreholes, such as water wells. Liquid drilling fluid is often called "drilling mud." The three main categories of drilling fluids are water-based muds (which can be dispersed and non-dispersed), non-aqueous muds, usually called oil-based mud, and gaseous drilling fluid, in which a wide range of gases can be used.

The main functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion.

Water-based drilling mud most may include bentonite clay (gel) with additives such as barium sulfate (barite), calcium carbonate (chalk) or hematite. Various thickeners may be used to influence the viscosity of the fluid, e.g. xanthan gum, guar gum, glycol, carboxymethylcellulose, polyanionic cellulose (PAC), or starch. In turn, deflocculants may be used to reduce viscosity of clay-based muds; anionic polyelectrolytes (e.g. acrylates, polyphosphates, ligno-sulfonates (Lig) or tannic acid derivates such as Quebracho) may be used. Other components may be added to provide various specific functional characteristics. Some other additives may include lubricants, shale inhibitors, and/or fluid loss additives. A weighting agent such as barite may be added to increase the overall density of the drilling fluid so that sufficient bottom hole pressure can be maintained thereby preventing an unwanted (and often dangerous) influx of formation fluids.

Sedimentation is the tendency for particles in suspension to settle out and come to rest. Numerous forces can act on a particle to promote settling (or "sagging"). These include, but are not limited to, gravity, centrifugal acceleration, electromagnetism, and the like. As used herein, "settling" or "sagging" is the falling of suspended particles through liquid. For the purposes of this disclosure, "settling" and "sagging" are used interchangeably. Sedimentation is the termination of the settling or sagging process. The "settling velocity" at which suspended particles settle may also depend on other factors including, but not limited to, their weight, diameter, and shape. As used herein, the term "sag resistance" is a measure of the resistance to flow with no shear on the material. Sag resistance may also generally refer to a suspension's ability to resist sagging of its particles.

Generally, the term "sag" relates to any unwanted variation in drilling fluid density. For purposes of the present disclosure the weight material sag, such as barite sag, phenomenon is defined as follows: weight-material sag is recognized by a significant (>0.5 lbm/gal) mud density variation, measured when circulating bottoms up where a weighted mud has remained uncirculated for a period of time in a directional well.

Sag of the weighting agents in a fluid used in oil field operations can cause large density variations that often lead to significant wellbore pressure management problems and potentially, wellbore failure. For example, when settling or sagging is prolonged in a drilling fluid that is in use, the upper part of a wellbore can lose mud density, which lessens the hydrostatic pressure in the hole. The density of a drilling fluid is determined by the particular mixture of its components, which typically include a base fluid (e.g., water, brines, oil, etc.), and additives (e.g., emulsifiers, viscosifiers, etc.). Additionally, fluid sag can lead to sticking of drill pipe, difficulty in re-initiating and/or maintaining proper circulation of the fluid, possible loss of circulation and disproportionate removal from the well of lighter components of the fluid.

This disclosure provides various non-corrosive, inexpensive, sag-resistant or sag-free, dense drilling fluids. Colloidal suspensions of materials such as silica, alumina, or other insoluble metal salts such as carbonates, sulphates, phosphates, silicates, metal silicon, hydroxides, oxides, sulphides, or other anions can be prepared which are very stable and do not settle in months or years. The stability of these dispersions is due to the extremely fine nature of the particles which are less than a micron in size and are below the critical Stokes diameter where Brownian motion is sufficient to prevent them from settling as well as other stabilizing effects from electrostatic charges or the presence of dispersants which prevent aggregation of the particles into larger faster settling aggregates. The dispersing media can be either water, oil or other suitable liquid.

As used herein, the term "particles" is not intended to be limiting and does not imply any particular shape.

As used herein, "colloidal suspension" refers to a combination of suspended particles and a suspension medium. The suspended particles may also be referred to as a dispersed phase. The suspension medium may also be referred to as a continuous phase. The suspended particles may be insoluble in the suspension medium. The suspended particles typically have a diameter of less than about 1000 nanometers. For example, the suspended particles may have a diameter in a range of from about 1 to about 1000 nanometers, from about 10 to about 900 nanometers, from about 100 to about 800 nanometers, from about 200 to about 700 nanometers, from about 300 to about 600 nanometers, or from about 400 to about 500 nanometers.

A sag-resistant fluid, such as a drilling fluid, completion fluid, or spacer fluid may include a colloidal suspension. The colloidal suspension may include a solid phase suspended in a continuous liquid phase.

The sag-resistant fluid may have a density of from 7 to 30 lbm/gal. For example, the sag-resistant fluid may have a density of from 8 to 19, from 9 to 18, from 10 to 17, from 11 to 16, from 12 to 15, or from 13 to 14 lbm/gal. The sag-resistant fluid may exhibit a density variation of less than 0.5 lbm/gal over a time period of at least 16 hours. For example, the sag-resistant fluid may exhibit a density variation of less than 0.5 lbm/gal over a time period of from 16 to 120 hours. For example, the sag-resistant fluid may exhibit a density variation of less than 0.5 lbm/gal over a time period of at least 42 hours, or over a time period of from 72 to 120 hours. The density variation over any of these time period may be less than 0.5 lbm/gal. For example, the density variation over any of these time periods may be less than 0.4 lbm/gal, less than 0.3 lbm/gal, less than 0.2 lbm/gal, or less than 0.1 lbm/gal.

Specific gravity is commonly used in industry as a simple means of obtaining information about the concentration of solutions of various materials. Specific gravity is the ratio of the density of a substance to the density (mass of the same unit volume) of a reference substance. Apparent specific gravity is the ratio of the weight of a volume of the substance to the weight of an equal volume of the reference substance. The reference substance is nearly always water for liquids or air for gases. Temperature and pressure must be specified for both the sample and the reference. Pressure is nearly always 1 atm equal to 101.325 kPa. Temperature is typically room temperature, i.e. about 25 degrees Celsius. The sag-resistant drilling fluid may have a specific gravity of at least 1.0. For example, the specific gravity of the sag-resistant drilling fluid may be in a range of from about 1.0 to about 100, from about 10 to about 90, from about 20 to about 80, from about 30 to about 70, from about 40 to about 60, or from about 5 to about 50.

Corrosion is the electrochemical oxidation of metals in reaction with an oxidant such as oxygen. Corrosion degrades the useful properties of materials and structures including strength, appearance and permeability to liquids and gases. A "corrosion allowance" as used herein, refers to an amount of material in a pipe or vessel that is available for corrosion without affecting the pressure containing integrity. In all piping systems, the expected corrosion rate may be constant or change with time. External corrosion (atmospheric corrosion, dampness in the soil, or chlorides from insulation) may be a factor. A ¹⁄₁₆-inch (0.0625") minimum corrosion allowance for carbon steel and low alloy steel piping is common, if the corrosion rate can be predicted accurately and is less than a defined threshold (3 mils per year or less as an example). For stainless steels, a ⅟₃₂-inch (0.03125") minimum corrosion allowance is usually sufficient. The sag-resistant fluids described herein, may provide or allow a carbon steel pipe to have, to exhibit, or to maintain a corrosion allowance of from about 3 to about 8 mm per year. The corrosion allowance may, for example, be from about 3.5 to about 7.5 mm per year, from about 4 to about 7 mm per year, from about 4.5 to about 6.5 mm per year, from about 4 to about 6 mm per year, from about 3.5 to about 5.5 mm per year, or from about 3 to about 5 mm per year. In other words, the sag-resistant drilling fluid may be generally non-corrosive, i.e. the sag-resistant drilling fluid may not cause additional corrosion to a pipe or other material.

The sag-resistant fluids may also exhibit low toxicity to marine organisms. Assuming that any contaminants accumulated during a drilling operation are eliminated or reduced to an acceptable leve, the sag-resistant fluids may, subject to appropriate environmental regulations, be disposed of in offshore waters due to low toxicity to marine organisms.

As described, the sag-resistant fluids may include a colloidal suspension. The colloidal suspension may include a solid phase suspended in a continuous liquid phase. The continuous liquid phase is selected from the group consisting of a glycol, glycerin, water, an oil, and combinations thereof. The glycol may be any glycol, including one selected from ethylene glycol, diethylene glycol, triethylene glycol, polyethylene glycols, propylene glycol, dipropylene glycol, tripropylene glycol, butylene glycol, and combinations thereof. The oil may be any oil, including one selected from diesel oil, mineral oil, synthetic oil, ester oils, glycerides of fatty acids, aliphatic esters, aliphatic ethers, aliphatic acetals, and combinations thereof.

The solid phase may be a plurality of particles. The plurality of particles may have an average diameter of less than 1000 nm. For example, the plurality of particles may have an average diameter in a range of from about 1 to about 1000 nanometers, from about 10 to about 900 nanometers, from about 100 to about 800 nanometers, from about 200 to about 700 nanometers, from about 300 to about 600 nanometers, or from about 400 to about 500 nanometers.

As used herein the term, "insoluble" means incapable of being dissolved in a given liquid. As used herein the term, "essentially insoluble" means soluble only with difficulty or to a slight degree. The solid phase may be insoluble or essentially insoluble in the continuous liquid phase.

As used herein, "solubility product constant" refers to a simplified equilibrium constant (Ksp) defined for equilibrium between a solid and its respective ions in a solution. Its value indicates the degree to which a compound dissociates in water. A higher solubility product constant indicates a more soluble compound. Generally, the Ksp expression for a salt can be expressed as the product of the concentrations of the ions, with each concentration raised to a power equal to the coefficient of that ion in the balanced equation for the solubility equilibrium. The solid phase may have a solubility product constant ($K_{sp}$) of less than about $1\times10^{-8}$ in the continuous liquid phase. For example, the solid phase may have a solubility product constant ($K_{sp}$) of less than about $1\times10^{-9}$, of less than about $1\times10^{-10}$, of less than about $1\times10^{-11}$, or of less than about $1\times10^{-12}$ in the continuous liquid phase.

Again, the sag-resistant fluids may include a colloidal suspension having a solid phase suspended in a continuous liquid phase. The concentration of the solid phase in the continuous liquid phase is from about 10 to about 50% by weight. For example, the concentration of the solid phase in the continuous liquid phase is from about 15 to about 45% by weight, or from about 20 to about 40% by weight, or from about 25 to about 35% by weight, or from about 30 to about 50% by weight.

The solid phase may include at least one selected from a metal, a metal oxide, a metal nitride, a metal ion, a metal salt, a metalloid, a metalloid oxide, a metalloid nitride, a metalloid salt, and combinations thereof.

The solid phase may include a metal selected from aluminum, a transition metal, and combinations thereof. The transition metal may be selected from, titanium, vanadium, chromium, cobalt, nickel, iron, copper, zinc, yttrium, zirconium, molybdenum, tungsten, and combinations thereof. The transition metal may also be selected from iron, manganese, and combinations thereof. Iron and manganese exhibit low toxicity and are inexpensive.

The solid phase may include a metal oxide. The metal oxide may include at least one metal, including but not limited to the metals described herein. For example, the metal oxide may be selected from aluminium oxide, iron oxide, manganese oxide, tin oxide, titanium oxide, zinc oxide, and combinations thereof.

The solid phase may include a metal nitride. The metal nitride may include at least one metal, including but not limited to the metals described herein. For example, the metal nitride may be selected from silicon nitride, boron nitride, zirconium nitride, tungsten nitride, molybdenum nitride, barium nitride, and combinations thereof.

The solid phase may include a metal ion. The metal ion may include at least one metal, including but not limited to the metals described herein. For example, the at least one metal in the metal ion may be selected from aluminum, iron, manganese, a transition metal, and combinations thereof. The metal ion may be, but is not limited to a sulfide, a nitride, and combinations thereof.

The solid phase may include a metal salt. The metal salt may include a metal and an anion. The metal can be any metal including but not limited to the metals described herein. For example, the metal may be selected from aluminum, a transition metal, a divalent metal, and combinations thereof. The divalent metal may be selected from calcium, magnesium, barium, bismuth, tin, and combinations thereof. The anion may be selected from a carbonate, a sulphate, a phosphate, a silicate, a hydroxide, an oxide, a sulphide, a titanate, a tungstenate, a molybdate and combinations thereof.

The solid phase may include a metalloid selected from boron, silicon, germanium, arsenic, antimony, tellurium, polonium and combinations thereof. For example, atomized ferrorsilicon can produce a suspension with specific gravity up to 3.4 (28 lbm/gal).

The solid phase may include a metalloid oxide. The metalloid oxide may include at least one metalloid selected from boron, silicon, germanium, arsenic, antimony, tellurium, polonium and combinations thereof. The metalloid oxide may also be selected from silica, titanium oxide, aluminum oxide, and combinations thereof.

The solid phase may include a metalloid nitride. The metalloid nitride may include at least one metalloid selected from the group consisting of boron, silicon, germanium, arsenic, antimony, tellurium, polonium and combinations thereof. The metalloid nitride may be selected from silicon nitride, titanium nitride, aluminum nitride, and combinations thereof.

The solid phase may include a metalloid salt. The metalloid salt may include a metalloid and an anion. The metalloid may be selected from boron, silicon, germanium, and combinations thereof. The anion may be selected from a carbonate, a sulphate, a phosphate, a silicate, a hydroxide, an oxide, a sulphide, and combinations thereof.

The present disclosure describes embodiments that relate to a subterranean well, such as the subterranean well depicted schematically in FIG. 1. In other embodiments, the subterranean well may include some, none, or all of the features shown in FIG. 1 without departing from the scope of the present disclosure. A wellbore 48 is shown that has been drilled into the earth 54 from the ground's surface 27 using a drill bit 22. The drill bit 22 is located at the bottom, distal end of the drill string 32 and the bit 22 and drill string 32 are being advanced into the earth 54 by the drilling rig 29. The drilling rig 29 can be supported directly on land as shown or on an intermediate platform if at sea. For illustrative purposes, the top portion of the well bore includes casing 34 that is typically at least partially comprised of cement and which defines and stabilizes the wellbore after being drilled.

As shown in FIG. 1, the drill string 32 supports several components along its length. A sensor sub-unit 52 is shown for detecting conditions near the drill bit 22, conditions which can include such properties as formation fluid density, temperature and pressure, and azimuthal orientation of the drill bit 22 or string 32. In the case of directional drilling, measurement while drilling (MWD)/logging while drilling (LWD) procedures are supported both structurally and communicatively. FIG. 1 shows an instance of directional drilling. The lower end portion of the drill string 32 can include a drill collar proximate the drilling bit 22 and a rotary steerable drilling device 20. The drill bit 22 may take the form of a roller cone bit or fixed cutter bit or any other type of bit known in the art. The sensor sub-unit 52 is located in or proximate to the rotary steerable drilling device 20 and may include sensors which detect the azimuthal orientation of the rotary steerable drilling device 20. Other sensor sub-units 35, 36 are shown within the cased portion of the well which can be enabled to sense nearby characteristics and conditions of the drill string, formation fluid, casing and surrounding formation. Regardless of which conditions or characteristics are sensed, data indicative of those conditions and characteristics is either recorded downhole, for instance at the processor 44, for later download, or communicated to the surface either by wire using repeaters 37,39 up to surface wire 72, or wirelessly, or otherwise. In some wireless embodiments, the downhole transceiver (antenna) 38 may be utilized to send data to a local processor 18 via topside transceiver (antenna) 14. There the data may be either processed or further transmitted along to a remote processor 12 via wire 16 or wirelessly via antennae 14 and 10.

FIG. 1 further shows implementations including coiled tubing 78 and wireline 30 procedures within the context of this disclosure.

In some embodiments, a sag-resistant fluid, such as a sag-resistant drilling mud/fluid 40, may be pumped via conduit 42 to a downhole mud motor 76 to provide an additional or alternative mode of communication. The drilling mud/fluid 40 may be circulated down through the drill string 32 and up the annulus 33 around the drill string 32 to cool the drill bit 22 and remove cuttings from the wellbore 48. For purposes of communication, resistance to the incoming flow of mud can be modulated downhole to send backpressure pulses up to the surface for detection at sensor 74, or to a pressure sensor disposed along drill string 32, and from which representative data is sent along communication channel 21 (wired or wirelessly) to one or more processors 18, 12 for recordation and/or processing. In further examples, the drilling mud/fluid is circulated to mud motor 76 which is employed to rotate the drill bit 22. The mud motor 76 may include a rotor and stator contained within the housing. The flow of mud causes rotation of the rotor within the stator, and in turn, rotates the drill bit 22.

The sensor sub-unit 52 is located along the drill string 32 above the drill bit 22. Additional sensor sub-units 36, 35 are shown in FIG. 1 positioned above the mud motor 76 that rotates the drill bit 22. Additional sensor sub-units 35, 36 can be included as desired in the drill string 32. The sub-unit 52 positioned below the motor 76 may communicate with the sub-units 36, 35 in order to relay information to the surface 27.

A surface installation 19 is shown that sends and receives data to and from the well. The surface installation 19 may include a local processor 18 in communication with one or more remote processors 12, 17 by wire 16 or wirelessly using transceivers 10, 14.

In one example, a mud motor 76 rotates the drill bit 22 as described above. Another example of a rotary drilling system includes a rotary steerable drilling device. Such a rotary steerable drilling device 20 is diagrammatically shown in FIG. 1. This arrangement can also be referred to as a drilling direction control device or system. As shown, the rotary drilling device 20 is positioned on the drill string 32 with drill bit 22. However, one of skill in the art will recognize that the positioning of the rotary steerable drilling device 20 on the drill string 22 and relative to other components on the drill string 22 may be modified while remaining within the scope of the present disclosure.

The rotary steerable drilling device 20 can have a sensor sub-unit 52. The sensor sub-unit may have a housing orientation sensor apparatus for sensing the orientation of the housing 46 within the wellbore. For instance, the housing orientation sensor apparatus can contain an At-Bit-Inclination (ABI) insert associated with the housing 46. Additionally, the rotary steerable drilling device 20 can have a drilling string orientation sensor apparatus 376. Sensors which can be employed to determine orientation include, for example, magnetometers and accelerometers.

One drilling method may include circulating any sag-resistant drilling fluid described herein through a well, such as shown in FIG. 1. For example, a method may include circulating a sag-resistant drilling fluid through a well, where the sag-resistant drilling fluid includes a colloidal suspension having a continuous liquid phase selected from a glycol, glycerin, water, an oil, and combinations thereof, and a solid phase suspended in the continuous liquid phase. The solid phase may include a plurality of particles, having an average diameter of less than 1000 nm. The sag-resistant drilling fluid may have a density of from 7 to 30 lbm/gal, and may exhibit a density variation of less than 0.5 lbm/gal over a time period of at least 16 hours.

EXAMPLES

Numerous examples are provided herein to enhance understanding of the present disclosure. A specific set of examples are provided as follows. In a first example, a sag-resistant fluid is provided that includes a colloidal suspension. The colloidal suspension may include a solid phase suspended in a continuous liquid phase, wherein the solid phase includes a plurality of particles, wherein an average diameter of the plurality of particles less than 1000 nm, wherein the sag-resistant drilling fluid has a density of from 7 to 30 lbm/gal, and wherein the sag-resistant fluid exhibits a density variation of less than 0.5 lbm/gal over a time period of at least 16 hours.

In a second example, a sag-resistant fluid is disclosed according to the first example, wherein the sag-resistant fluid exhibits a density variation of less than 0.5 lbm/gal over a time period of at least 42 hours.

In a third example, a sag-resistant fluid is disclosed according to the first or second examples, wherein the sag-resistant fluid exhibits a density variation of less than 0.5 lbm/gal over a time period of from 72 to 120 hours.

In a fourth example, a sag-resistant fluid is disclosed according to any of the first through third examples, wherein the sag-resistant fluid has a specific gravity of at least 1.0.

In a fifth example, a sag-resistant fluid is disclosed according to any of the first through fourth examples, wherein the sag-resistant fluid provides a corrosion allowance of from 3 to 8 mm per year for carbon steel pipe.

In a sixth example, a sag-resistant fluid is disclosed according to any of the first through fifth examples, wherein the continuous liquid phase is selected from a glycol, glycerin, water, an oil, and combinations thereof.

In a seventh example, a sag-resistant fluid is disclosed according to claim 6, wherein the glycol is selected from ethylene glycol, diethylene glycol, triethylene glycol, polyethylene glycols, propylene glycol, dipropylene glycol, tripropylene glycol, butylene glycol, and combinations thereof.

In a eighth example, a sag-resistant fluid is disclosed according to any of the first through seventh examples, wherein the oil is selected from diesel oil, mineral oil, synthetic oil, ester oils, glycerides of fatty acids, aliphatic esters, aliphatic ethers, aliphatic acetals, and combinations thereof.

In a ninth example, a sag-resistant fluid is disclosed according to any of the first through eighth examples, wherein the solid phase is essentially insoluble in the continuous liquid phase.

In a tenth example, a sag-resistant fluid is disclosed according to any of the first through ninth examples, wherein the solid phase has a solubility product constant (Ksp) of less than $1 \times 10^{-8}$ in the continuous liquid phase.

In an eleventh example, a sag-resistant fluid is disclosed according to any of the first through tenth examples, wherein a concentration of the solid phase in the continuous liquid phase is from 10 to 50% by weight.

In a twelfth example, a sag-resistant fluid is disclosed according to any of the first through eleventh examples, wherein the solid phase includes at least one selected from a metal, a metal oxide, a metal nitride, a metal ion, a metal salt, a metalloid, a metalloid oxide, a metalloid nitride, a metalloid salt, and combinations thereof. For example, ferrosilicon colloidal particles have been used in producing a stable suspension with specific gravity of approximately 2.0 to 4.0, for applications in the mineral separation and concentration processes.

In a thirteenth example, a sag-resistant fluid is disclosed according to any of the first through twelfth examples, wherein the solid phase includes a metal selected from aluminum, a transition metal, and combinations thereof.

In a fourteenth example, a sag-resistant fluid is disclosed according to the thirteenth example, wherein the transition metal is selected from iron, manganese, and combinations thereof.

In a fifteenth example, a sag-resistant fluid is disclosed according to the thirteenth example, wherein the transition metal is selected from scandium, titanium, vanadium, chromium, cobalt, nickel, copper, zinc, yttrium, zirconium, platinum, gold, mercury, rutherfordium, dubnium, seaborgium, bohrium, hassium, meitnerium, ununbium, niobium, iridium, molybdenum, technetium, ruthenium, rhodium, palladium, silver, cadmium, hafnium, tantalum, tungsten, rhenium, osmium, and combinations thereof.

In a sixteenth example, a sag-resistant fluid is disclosed according to any of the first through fifteenth examples, wherein the solid phase includes a metal oxide, wherein the metal oxide includes at least one metal.

In a seventeenth example, a sag-resistant fluid is disclosed according to the sixteenth example, wherein the at least one metal is selected from aluminum, a transition metal, and combinations thereof.

In a eighteenth example, a sag-resistant fluid is disclosed according to the sixteenth example, wherein the metal oxide is selected from aluminium oxide, iron oxide, manganese oxide, tin oxide, titanium oxide, zinc oxide, and combinations thereof.

In a nineteenth example, a sag-resistant fluid is disclosed according to any of the first through eighteenth examples, wherein the solid phase includes a metal nitride, wherein the metal nitride includes at least one metal.

In a twentieth example, a sag-resistant fluid is disclosed according to the nineteenth example, wherein the at least one metal is selected from aluminum, a transition metal, and combinations thereof.

In a twenty-first example, a sag-resistant fluid is disclosed according to any of the first through twentieth examples, wherein the metal nitride is silicon nitride, boron nitride, zirconium nitride, tungsten nitride, molybdenum nitride, barium nitride, and combinations thereof.

In a twenty-second example, a sag-resistant fluid is disclosed according to any of the first through twenty-first examples, wherein the solid phase includes a metal ion, wherein the metal ion includes at least one metal.

In a twenty-third example, a sag-resistant fluid is disclosed according to the twenty-second example, wherein the at least one metal is selected from aluminum, iron, manganese, a transition metal, and combinations thereof.

In a twenty-fourth example, a sag-resistant fluid is disclosed according to any of the first through twenty-third examples, wherein the metal ion is selected from a sulfide, a nitride, and combinations thereof.

In a twenty-fifth example, a sag-resistant fluid is disclosed according to any of the first through twenty-fourth examples, wherein the solid phase includes a metal salt, and wherein the metal salt includes a metal and an anion.

In a twenty-sixth example, a sag-resistant fluid is disclosed according to the twenty-fifth example, wherein the anion is selected from a carbonate, a sulphate, a phosphate, a silicate, a hydroxide, an oxide, a sulphide, a titanate, a tungstenate, a molybdate and combinations thereof.

In a twenty-seventh example, a sag-resistant fluid is disclosed according to the twenty-fifth example, wherein the metal is selected from aluminum, a transition metal, a divalent metal, and combinations thereof.

In a twenty-eighth example, a sag-resistant fluid according to claim 26, wherein the transition metal is selected from iron and manganese.

In a twenty-ninth example, a sag-resistant fluid is disclosed according to the twenty-sixth example, wherein the transition metal is selected from, chromium, cobalt, nickel, copper, zinc, zirconium, molybdenum, tantalum, tungsten, and combinations thereof.

In a thirtieth example, a sag-resistant fluid is disclosed according to the twenty-sixth example, wherein the divalent metal is selected from calcium, magnesium, barium, bismuth, tin, and combinations thereof.

In a thirty-first example, a sag-resistant fluid is disclosed according to any of the first through thirtieth examples, wherein the solid phase includes a metalloid selected from boron, silicon, germanium, arsenic, antimony, tellurium, polonium and combinations thereof.

In a thirty-second example, a sag-resistant fluid is disclosed according to any of the first through thirty-first examples, wherein the solid phase includes a metalloid oxide, including at least one metalloid selected from boron, silicon, germanium, and combinations thereof.

In a thirty-third example, a sag-resistant fluid is disclosed according to the thirty-second, wherein the metalloid oxide is selected from silica, titanium oxide, aluminum oxide, and combinations thereof.

In a thirty-fourth example, a sag-resistant fluid is disclosed according to any of the first through thirty-third examples, wherein the solid phase includes a metalloid nitride, including at least one metalloid selected from boron, silicon, germanium and combinations thereof.

In a thirty-fifth example, a sag-resistant fluid is disclosed according to any of the first through thirty-fourth examples, wherein the metalloid nitride is silicon nitride, titanium nitride, aluminum nitride, and combinations thereof.

In a thirty-sixth example, a sag-resistant fluid is disclosed according to any of the first through thirty-fifth examples, wherein the solid phase includes a metalloid salt, including a metalloid and an anion, wherein the metalloid is selected from boron, silicon, germanium, and combinations thereof.

In a thirty-seventh example, a sag-resistant fluid is disclosed according to the thirty-sixth example, wherein the anion is selected from a carbonate, a sulphate, a phosphate, a silicate, a hydroxide, an oxide, a sulphide, and combinations thereof.

In a thirty-eighth example, the sag-resistant fluid is selected from a sag-resistant drilling fluid, a sag-resistant completion fluid, and a sag-resistant spacer fluid.

In a thirty-ninth example, a method is provided that includes adding a sag-resistant fluid to a well. For example, a sag-resistant drilling fluid may be circulated through a well. The sag-resistant fluid may include a colloidal suspension, the colloidal suspension may include a continuous liquid phase selected from a glycol, glycerin, water, an oil, and combinations thereof. The colloidal suspension may further include a solid phase suspended in the continuous liquid phase, wherein the solid phase includes a plurality of particles, wherein an average diameter of the plurality of particles less than 1000 nm. The sag-resistant fluid may have a density of from 7 to 30 lbm/gal, and exhibit a density variation of less than 0.5 lbm/gal over a time period of at least 16 hours.

In a fortieth example, the sag-resistant fluid added to the well is selected from a sag-resistant drilling fluid, a sag-resistant completion fluid, and a sag-resistant spacer fluid.

In a forty-first example, the sag-resistant fluid is a sag-resistant drilling fluid and the method according to the thirty-ninth example includes circulating the sag-resistant drilling fluid through the well.

Another example of a sag-resistant drilling fluid is a colloidal silica sol at 1.4 g/mL. Another example of a sag-resistant drilling fluid is a colloidal suspension of mangese carbonate having a specific gravity of about 3.12. Still another example is a colloidal suspension of manganese phosphate and manganese oxide, such as that commercially sold as a plant nutrient mix and having a density of 13.5 lb/gal. Many examples provide a heavy, dense, cheap, environmentally acceptable, acid soluble drilling fluid with sag resistant properties.

Although the present disclosure has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A sag-resistant wellbore fluid comprising:
   a fluid selected from the group consisting of a drilling fluid, a completion fluid, and a spacer fluid; and
   a colloidal suspension dispersed within the fluid, the colloidal suspension comprising:
   an oil based continuous liquid phase, and
   a solid phase comprising a plurality of solid particles, the plurality of solid particles suspended throughout the continuous liquid phase, the plurality of solid particles having an average diameter of less than about 1000 nm and wherein a concentration of the plurality of solid particles suspended in the continuous liquid phase is from about 10 to about 50% by weight, wherein the colloidal suspension provides a corrosion allowance of from about 3 to about 8 mm per year for carbon steel pipe;

wherein the sag-resistant wellbore fluid has a density of from about 7 lbm/gal to about 30 lbm/gal and exhibits a density variation of less than about 0.5 lbm/gal over a time period of about 16 hours to 120 hours; and wherein the colloidal suspension is not an emulsion.

2. The sag-resistant fluid according to claim 1, wherein the sag-resistant fluid exhibits a density variation of less than about 0.5 lbm/gal over a time period of about 42 hours to 120 hours.

3. The sag-resistant fluid according to claim 1, wherein the sag-resistant fluid exhibits a density variation of less than about 0.5 lbm/gal over a time period of from about 72 to about 120 hours.

4. The sag-resistant fluid according to claim 1, wherein the sag-resistant fluid has a specific gravity from at least about 1.0 to about 3.6.

5. The sag-resistant fluid according to claim 1, wherein the oil based continuous liquid phase is selected from the group consisting of diesel oil, mineral oil, synthetic oil, ester oils, glycerides of fatty acids, aliphatic esters, aliphatic ethers, aliphatic acetals, and combinations thereof.

6. The sag-resistant fluid according to claim 1, wherein the solid phase is insoluble in the continuous liquid phase.

7. The sag-resistant fluid according to claim 1, wherein the solid phase has a solubility product constant ($K_{sp}$) of less than about $1 \times 10^{-8}$ in the continuous liquid phase.

8. The sag-resistant fluid according to claim 1, wherein the solid phase comprises at least one selected from the group consisting of a metal, a metal oxide, a metal nitride, a metal ion, a metal salt, a metalloid, a metalloid oxide, a metalloid nitride, a metalloid salt, and combinations thereof.

9. The sag-resistant fluid according to claim 8, wherein the solid phase comprises the metal ion, the metal ion is selected from the group consisting of a sulfide, a nitride, and combinations thereof.

10. The sag-resistant fluid according to claim 1, wherein the solid phase comprises a metal selected from the group consisting of aluminum, a transition metal, and combinations thereof.

11. The sag-resistant fluid according to claim 1, wherein the solid phase comprises a metal oxide, wherein the metal oxide comprises at least one metal.

12. The sag-resistant fluid according to claim 1, wherein the solid phase comprises a metal nitride, wherein the metal nitride comprises at least one metal.

13. The sag-resistant fluid according to claim 1, wherein the solid phase comprises a metal salt, and wherein the metal salt comprises a metal and an anion.

14. The sag-resistant fluid according to claim 1, wherein the solid phase comprises a metalloid selected from the group consisting of boron, silicon, germanium, arsenic, antimony, tellurium, polonium and combinations thereof.

15. The sag-resistant fluid according to claim 1, wherein the solid phase comprises a metalloid nitride, comprising at least one metalloid selected from the group consisting of boron, silicon, germanium, and combinations thereof.

16. The sag-resistant fluid according to claim 1, wherein the solid phase comprises a metalloid salt, comprising a metalloid and an anion, wherein the metalloid is selected from the group consisting of boron, silicon, germanium, arsenic, antimony, tellurium, polonium and combinations thereof.

17. The sag-resistant fluid according to claim 1, wherein the fluid is the drilling fluid.

18. The sag-resistant fluid according to claim 1, wherein the solid phase consists of the plurality of particles.

19. A method comprising:

providing a sag-resistant fluid comprising a fluid selected from the group consisting of a drilling fluid, a completion fluid, and a spacer fluid, the fluid having a colloidal suspension dispersed therein, the colloidal suspension comprising:

an oil based continuous liquid phase, and a solid phase comprising a plurality of solid particles, the plurality of solid particles suspended throughout the continuous liquid phase, the plurality of solid particles having an average diameter of less than about 1000 nm, wherein the sag-resistant fluid has a density of from about 7 to about 30 lbm/gal and exhibits a density variation of less than about 0.5 lbm/gal over a time period of about 16 hours to 120 hours, and wherein a concentration of the plurality of particles suspended in the continuous liquid phase is from about 10 to about 50% by weight;

pumping the sag-resistant fluid into a wellbore in a drilling stage, and circulating the sag-resistant fluid back uphole, and wherein the colloidal suspension provides a corrosion allowance of from about 3 to about 8 mm per year for carbon steel pipe; and wherein the colloidal suspension is not an emulsion.

20. The method according to claim 19, wherein the fluid is the drilling fluid and the method comprises circulating the drilling fluid through the wellbore.

21. The method according to claim 19, further comprising removing, via the sag-resistant fluid, a plurality of cuttings from the wellbore.

22. The method according to claim 19, further comprising:

adjusting the resistance to flow of the sag-resistant fluid, and sending pulses from within the wellbore to a surface of the wellbore, via the sag-resistant fluid.

23. The method of claim 22, further comprising detecting, via a sensor, the pulses transferred via the sag-resistant fluid.

24. The method of claim 23, wherein the sensor is a pressure sensor disposed at a predetermined location on a drill string disposed within the wellbore.

25. The method of claim 23, the plurality of solid particles comprising a metalloid oxide including at least one metalloid selected from boron, germanium, and combinations thereof.

* * * * *